(12) United States Patent
Raveendran et al.

(10) Patent No.: US 10,967,846 B2
(45) Date of Patent: Apr. 6, 2021

(54) VEHICLE SPEED CONTROL (71) Applicant: JAGUAR LAND ROVER LIMITED, Coventry (GB)

(72) Inventors: Arun Raveendran, Warwickshire (GB); Andrew Fairgrieve, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 16/075,465

(22) PCT Filed: Feb. 10, 2017

(86) PCT No.: PCT/EP2017/053014
§ 371 (c)(1),
(2) Date: Aug. 3, 2018

(87) PCT Pub. No.: WO2017/137566
PCT Pub. Date: Aug. 17, 2017

(65) Prior Publication Data
US 2019/0039591 A1 Feb. 7, 2019

(30) Foreign Application Priority Data
Feb. 11, 2016 (GB) .................................... 1602440

(51) Int. Cl.
*B60W 10/06* (2006.01)
*B60W 10/18* (2012.01)
(Continued)

(52) U.S. Cl.
CPC ............ *B60W 10/06* (2013.01); *B60W 10/18* (2013.01); *B60W 10/22* (2013.01);
(Continued)

(58) Field of Classification Search
None
See application file for complete search history.

(56) References Cited

U.S. PATENT DOCUMENTS 8,831,813 B1 * 9/2014 Ferguson ................ B60T 7/042
701/23
9,734,719 B2 * 8/2017 Flehmig ................ G08G 1/166
(Continued)

FOREIGN PATENT DOCUMENTS

GB 2507622 A * 5/2014 .......... B60W 30/162
JP 2008137442 A 6/2008
(Continued)

OTHER PUBLICATIONS

International Search Report and Written Opinion, PCT/EP2017/053014, dated May 31, 2017, 14 pages.
(Continued)

*Primary Examiner* — David P. Merlino
(74) *Attorney, Agent, or Firm* — Miller Nash Graham & Dunn LLP (57) ABSTRACT

Some embodiments of the invention provide a speed control system (10, 12) for a vehicle (100), comprising: torque control means (12) for automatically causing application of positive and negative torque, as required, to one or more wheels (111, 112, 114, 115) of a vehicle (100) to cause a vehicle (100) to travel in accordance with a target speed value; path prediction means (10) for predicting a path PP of the vehicle (100) in a direction of travel; detection means (10) for detecting one or more objects (195) ahead of the vehicle (100); determining means (10) to determine whether one or more objects (195) detected by the detection means (10) lie outside the predicted path (PP); and control means (12) configured to, if said one or more detected objects (195) are determined to lie outside the predicted path (PP), automatically temporarily reduce the vehicle speed in depen-
(Continued)

dence at least in part on a distance of the one or more detected objects (195) from the predicted path (PP).

19 Claims, 6 Drawing Sheets

(51) Int. Cl.
*B60W 10/22* (2006.01)
*B60W 30/095* (2012.01)
*B60W 30/14* (2006.01)

(52) U.S. Cl.
CPC .... *B60W 30/0953* (2013.01); *B60W 30/0956* (2013.01); *B60W 30/143* (2013.01); *B60W 30/146* (2013.01); *B60W 2540/215* (2020.02); *B60W 2540/30* (2013.01); *B60W 2554/00* (2020.02); *B60W 2720/10* (2013.01); *B60W 2720/30* (2013.01)

(56) References Cited

U.S. PATENT DOCUMENTS

| | | | |
|---|---|---|---|
| 9,956,956 B2* | 5/2018 | Ali | B60W 50/0098 |
| 2009/0125203 A1* | 5/2009 | Lindqvist | B60W 10/06 |
| | | | 701/96 |
| 2009/0254260 A1* | 10/2009 | Nix | B60W 30/16 |
| | | | 701/96 |
| 2010/0121526 A1* | 5/2010 | Pham | B60W 30/146 |
| | | | 701/36 |
| 2014/0005908 A1* | 1/2014 | Kollberg | B60W 10/06 |
| | | | 701/96 |
| 2014/0067226 A1* | 3/2014 | Lee | B60W 30/143 |
| | | | 701/96 |
| 2014/0142798 A1* | 5/2014 | Guarnizo Martinez | |
| | | | B60W 30/09 |
| | | | 701/23 |
| 2014/0297135 A1* | 10/2014 | Larsson | B60W 30/09 |
| | | | 701/50 |
| 2015/0203117 A1* | 7/2015 | Kelly | B60K 31/02 |
| | | | 701/91 |
| 2017/0039855 A1* | 2/2017 | Maeda | B60W 30/09 |
| 2018/0074497 A1* | 3/2018 | Tsuji | B60W 50/085 |
| 2018/0134294 A1* | 5/2018 | Knoller | B60W 50/0097 |
| 2018/0208178 A1* | 7/2018 | Owen | B60W 50/0097 |
| 2019/0146515 A1* | 5/2019 | De Salvo | B60W 30/0953 |
| | | | 701/23 |

FOREIGN PATENT DOCUMENTS

| | | |
|---|---|---|
| JP | 2011141663 A | 7/2011 |
| WO | 2012091637 A1 | 7/2012 |
| WO | 2014078682 A1 | 5/2014 |

OTHER PUBLICATIONS

Search and Examination Report, GB1602440.8, dated Aug. 4, 2016, 6 pages.
Search and Examination Report, GB1702223.7, dated Jul. 27, 2017, 7 pages.

* cited by examiner

VEHICLE SPEED CONTROL

CROSS-REFERENCE TO RELATED APPLICATIONS

This application is a 371 of International Application No. PCT/EP2017/053014, filed Feb. 10, 2017, which claims priority to GB Patent Application 1602440.8, filed Feb. 11, 2016, the contents of both of which are incorporated by reference herein in their entirety.

INCORPORATION BY REFERENCE

The content of co-pending UK patent applications GB2507622 and GB2499461 are hereby incorporated by reference. The content of U.S. Pat. No. 7,349,776 and co-pending international patent applications WO2013124321 and WO2014/139875 are incorporated herein by reference. The content of UK patent applications GB2492748, GB2492655 and GB2499279 and UK patent GB2508464 are also incorporated herein by reference.

FIELD OF THE INVENTION

The invention relates to a system for controlling the speed of a vehicle. In particular, but not exclusively, the invention relates to a system for controlling the speed of a land-based vehicle which is capable of driving in a variety of different and extreme terrains and conditions.

BACKGROUND

In known vehicle speed control systems, typically referred to as cruise control systems, the vehicle speed is maintained on-road once set by the user without further intervention by the user so as to improve the driving experience for the user by reducing workload. Cruise control speed (or cruise set-speed) is settable by the vehicle driver, typically by pressing a button when the vehicle is at the desired speed. Plus and minus buttons provide for incremental speed variation whilst the cruise control is set.

Once the user has selected a speed at which the vehicle is to be maintained, the vehicle is maintained at that speed for as long as the user does not apply a brake or, in the case of a vehicle having a manual transmission, depress a clutch pedal. The cruise control system takes its speed signal from a driveshaft speed sensor or wheel speed sensors. When the brake or a clutch pedal is depressed, the cruise control system is disabled so that the user can override the cruise control system to change the vehicle speed without resistance from the system. When the cruise control system is active, if the user depresses the accelerator pedal a sufficient amount the vehicle speed will increase, but once the user removes his foot from the accelerator pedal the vehicle reverts to the pre-set cruise speed by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TCS) or stability control system (SCS). Accordingly, they are not well suited to maintaining vehicle progress when driving in off road conditions where such events may be relatively common.

Some vehicles are adapted for off-highway use, and low-speed cruise control systems for such vehicles have been developed. In off-highway conditions low-speed cruise control systems permit a driver, particularly a novice driver, to concentrate upon activities such as steering.

Low-speed cruise control systems suitable for off-road use may be configured to cause a vehicle to travel at a speed that is below the user-determined set-speed in dependence on the roughness of the terrain over which the vehicle is travelling. Nevertheless the present applicant has recognised that there are circumstances other than driving over rough terrain in which a reduced vehicle speed would be helpful to a user endeavouring to negotiate the terrain.

It is also known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function or configuration modes.

The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the subsystems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR)® System or controller. The driving modes may also be referred to as terrain modes, terrain response modes, or control modes.

GB2492655B discloses a control system for a motor vehicle in which the most appropriate terrain mode for the prevailing terrain over which the vehicle is driving is determined automatically by the control system. The control system then causes the vehicle to operate in the terrain mode determined to be the most appropriate.

It is against this background that the present invention has been conceived. Embodiments of the invention may provide an apparatus, a method or a vehicle which addresses the above problems. Other aims and advantages of the invention will become apparent from the following description, claims and drawings.

SUMMARY OF THE INVENTION

In one aspect of the invention for which protection is sought there is provided a control system for a vehicle, comprising:

torque control means for automatically causing application of positive and negative torque, as required, to one or more wheels of a vehicle to cause a vehicle to travel in accordance with a target speed value;

path prediction means for predicting a path of the vehicle in a direction of travel;

detection means for detecting one or more objects ahead of the vehicle;

determining means to determine whether one or more objects detected by the detection means lie outside the predicted path; and control means configured to, if said one or more detected objects are determined to lie outside the predicted path, automatically temporarily reduce the vehicle speed in dependence at least in part on a distance of the one or more detected objects from the predicted path.

It is to be understood that the path prediction means may predict a path of the vehicle based at least in part on vehicle location and steering angle. In some embodiments, in the case that the detection means comprises a vehicle-mounted stereoscopic camera arrangement for obtaining 3D point cloud data, the path prediction means may predict the path ahead of the vehicle on the basis that the path has a curvature corresponding to the steering angle, the vehicle being located at an origin of a frame of reference of the 3D point cloud data. Alternatively any other technology suitable for generating a 3D point cloud of the area in front of the vehicle may be used, for example any three dimensional imaging technique such as a scanning radar or lidar system.

Optionally, automatically reducing the vehicle speed comprises the control means reducing the vehicle speed in the event that one or more detected objects are within a predetermined distance of the predicted path.

Optionally, reducing the vehicle speed comprises the control means limiting the vehicle speed to a speed limit value, and wherein said speed limit value is determined at least in part in dependence on the distance of the one or more detected objects from the predicted path and/or a height of the one or more detected objects.

Optionally the control system is configured wherein the speed limit value is arranged to reduce with reducing distance of the one or more detected objects from the predicted path.

The control system may be operable to determine a distance at which the temporary reduction in vehicle speed should commence.

Optionally the speed limit value may be a predetermined speed limit value.

Optionally the control system is configured wherein automatically reducing the vehicle speed comprises the control means reducing the vehicle speed at least in part in dependence on the identity of a selected one of a plurality of driving modes in which the vehicle is operating.

Optionally the control system is configured wherein in each driving mode at least one of a plurality of vehicle subsystems is caused to operate in a predetermined one of a plurality of configuration modes of that subsystem, the subsystem configuration mode being determined in dependence on the selected driving mode.

Optionally the control system is configured wherein the subsystems include at least one of a powertrain subsystem, a brakes subsystem and a suspension subsystem.

Optionally the control system is configured wherein the torque control means comprises an electric controller configured to communicate with a powertrain controller and a brakes controller.

Optionally the control system is configured to automatically temporarily reduce the vehicle speed in further dependence at least in part on a comfort indicator generated in response to a control input provided by a user.

The control input may be generated by means of a switch, a dial, a touch screen interface or by any other suitable means. It is to be understood that if the vehicle speed is already sufficiently low according to the comfort indicator, and no other reason for reducing speed exists, vehicle speed may not be reduced in response to the comfort indicator.

Optionally the control system comprises an electronic processor configured to receive information from the detection means indicative of the presence of one or more detected objects ahead of the vehicle, and an electronic memory device electrically coupled to the electronic processor and having instructions stored therein, wherein the processor is configured to access the memory device and execute the instructions stored therein such that it is operable to:

cause application of positive and negative torque to one or more wheels of a vehicle to cause a vehicle to travel in accordance with a target speed value;

predict a path of the vehicle in a direction of travel; and determine whether one or more objects detected by the detection means lie outside the predicted path and, if said one or more detected objects are determined to lie outside the predicted path, automatically temporarily reduce the vehicle speed in dependence at least in part on a distance of the one or more detected objects from the predicted path.

The detection means may comprise a stereoscopic camera or a lidar system.

The control system may further comprise a proximity sensor.

The control means may be configured to refine the reduced vehicle speed based on data from the proximity sensor.

The control means may be configured to determine when the vehicle has passed the object and to increase the vehicle speed.

The path prediction means for predicting a path of the vehicle in a direction of travel may be configured to receive one or more of; image date, point cloud data, and steering angle data.

In a further aspect of the invention for which protection is sought there is provided a vehicle comprising a control system according to a preceding aspect.

In another aspect of the invention for which protection is sought there is provided a method of controlling the speed of a vehicle implemented by means of a control system, comprising:

automatically causing application of positive and negative torque to one or more wheels of a vehicle to cause a vehicle to travel in accordance with a target speed value; and predicting a path of the vehicle in a direction of travel; and detecting whether one or more detectable objects are present ahead of the vehicle, whereby the method further comprises determining whether one or more detectable objects ahead of the vehicle lie outside the predicted path, in the event that one or more detectable objects are determined to be present ahead of the vehicle and to lie outside the predicted path the method comprising automatically reducing he vehicle speed in dependence at least in part on a distance of the one or more detectable objects from the predicted path.

In an aspect of the invention for which protection is sought there is provided a non-transient carrier medium carrying a computer readable code for controlling a vehicle to carry out the method of another aspect.

In an aspect of the invention for which protection is sought there is provided a computer program product executable on a processor so as to implement the method of another aspect.

In an aspect of the invention for which protection is sought there is provided a computer readable medium loaded with the computer program product of another aspect.

In an aspect of the invention for which protection is sought there is provided a processor arranged to implement the method of another aspect, or the computer program product of another aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

The present invention will now be described, by way of example only, with reference to the accompanying drawings, in which.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to the function block is made for ease of explanation of the manner of operation of embodiments of the present invention.

Figure 1:
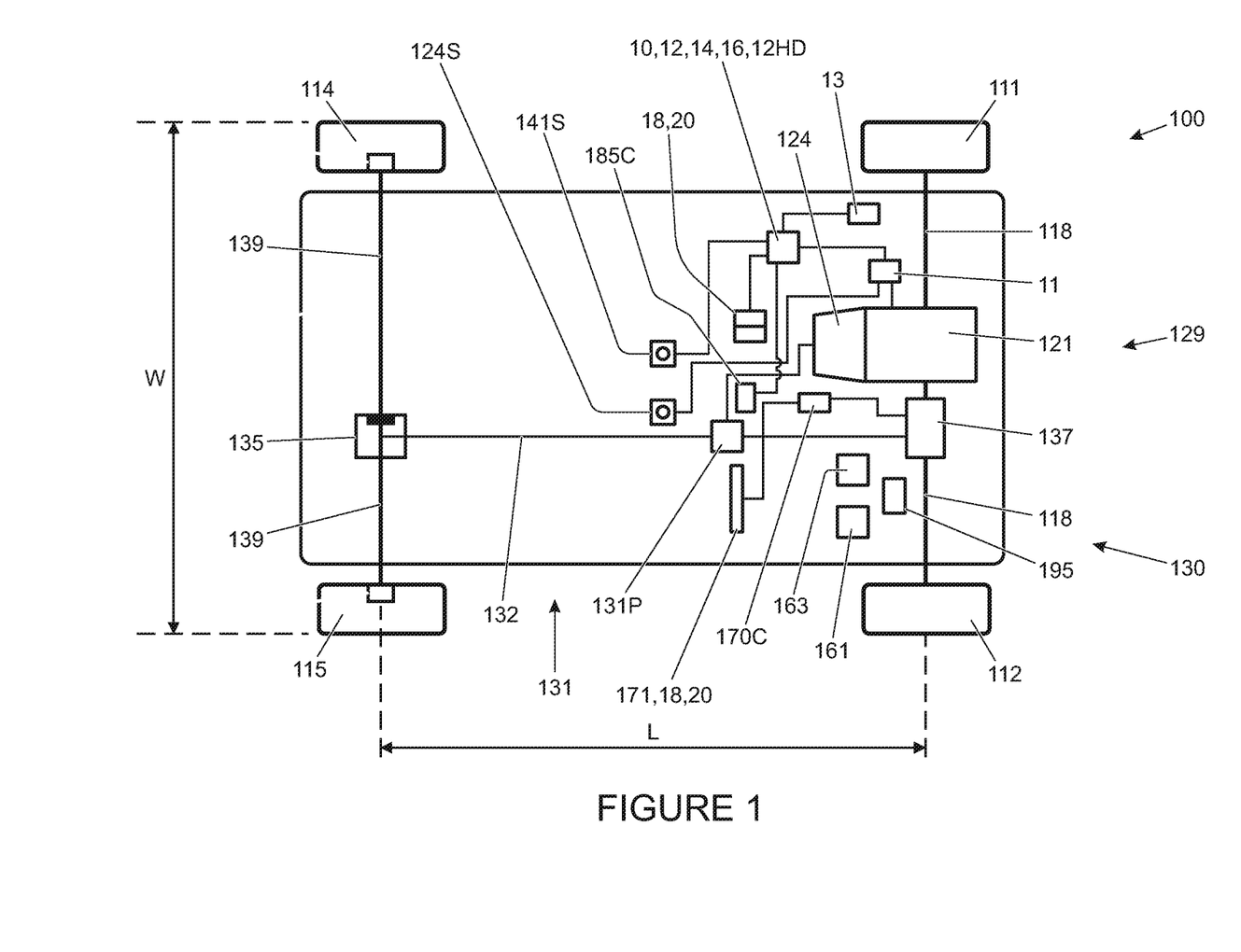
FIG. 1 is a schematic illustration of a vehicle according to an embodiment of the invention in plan view.
Figure 2:
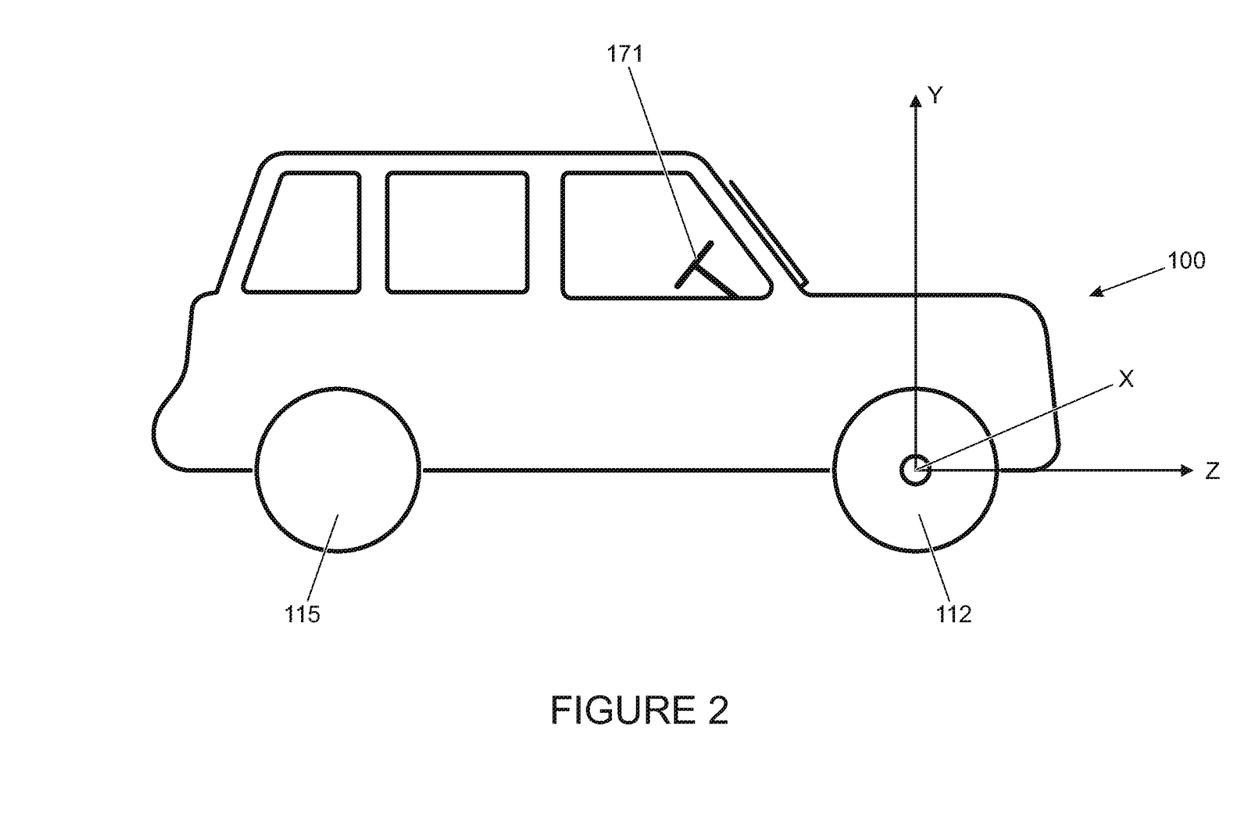
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode, a reverse mode, a neutral mode, a drive mode or a sport mode, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
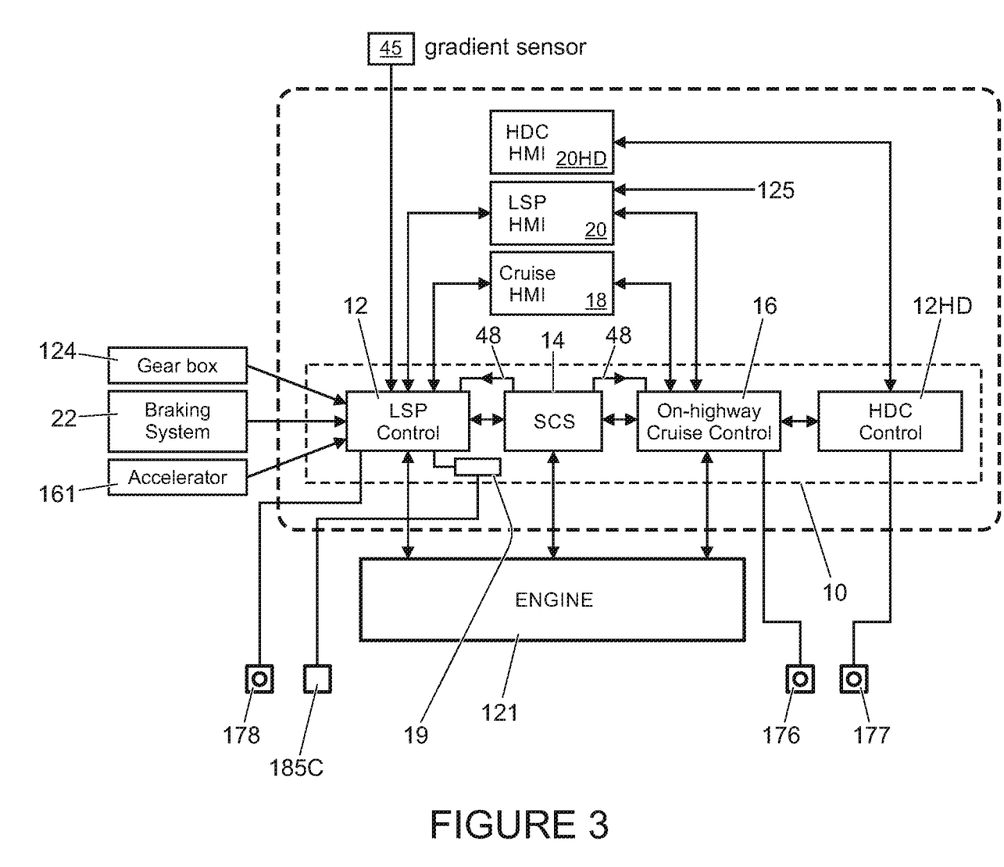
FIG. 3 is a high level schematic diagram of an embodiment of the vehicle control system of the present invention, including a cruise control system and a low-speed progress control system.
Figure 4:
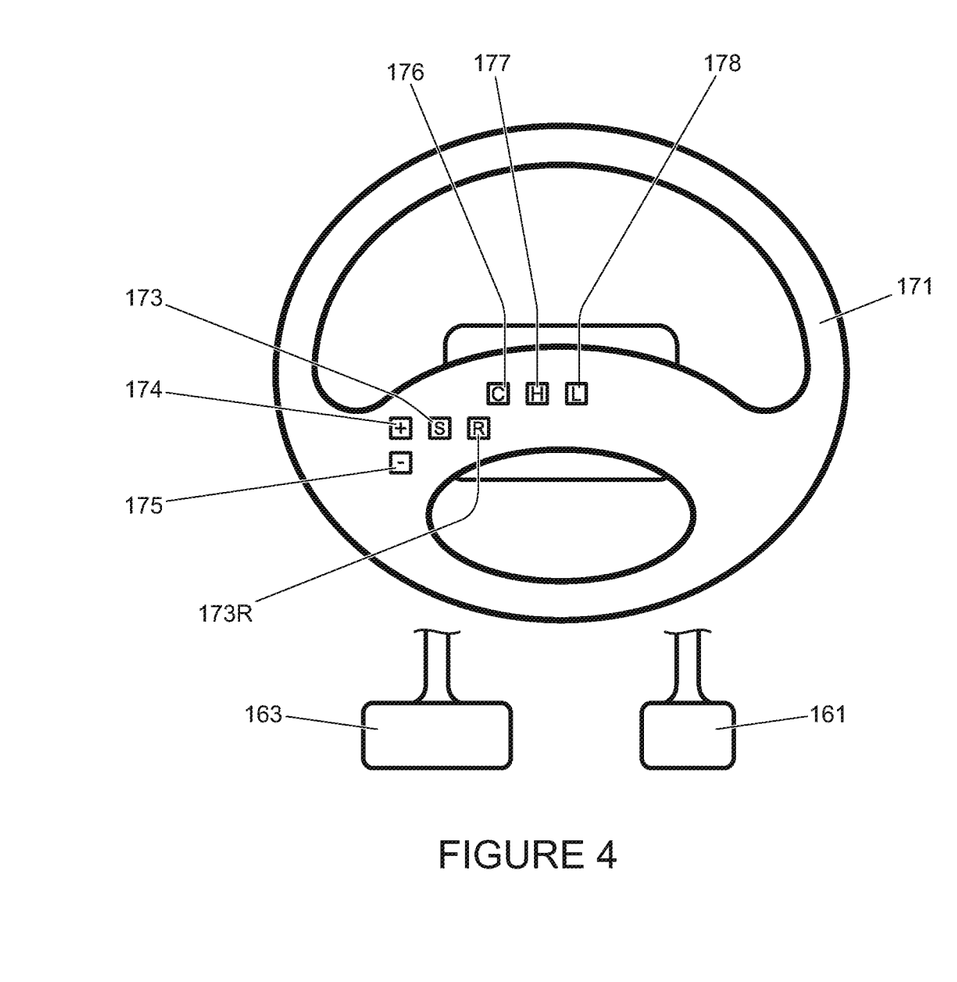
FIG. 4 illustrates a steering wheel of a vehicle according to the embodiment of FIG. 1.

A control system for the vehicle engine 121 includes a central controller 10, referred to as a vehicle control unit (VCU) 10, the powertrain controller 11, a brake controller 13 (an anti-lock braking system (ABS) controller) and a steering controller 170C. The ABS controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 (which may also be referred to as a low-speed speed control system) shown in FIG. 3, a stability control system (SCS) 14, a cruise control system 16 and a hill descent control (HDC) system 12HD. The SCS 14 improves the safety of the vehicle 100 by detecting and managing loss of traction or steering control. When a reduction in traction or steering control is detected, the SCS 14 is operable automatically to command the ABS controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the ABS controller 13.

Although not shown in detail in FIG. 3, the VCU 10 further includes a Traction Control (TC) function block. The TC function block is implemented in software code run by a computing device of the VCU 10. The ABS controller 13 and TC function block provide outputs indicative of, for example, TC activity, ABS activity, brake interventions on individual wheels and engine torque requests from the VCU 10 to the engine 121 in the event a wheel slip event occurs. Each of the aforementioned events indicate that a wheel slip event has occurred. In some embodiments the ABS controller 13 implements the TC function block. Other vehicle sub-systems such as a roll stability control system or the like may also be included.

Figure 5:
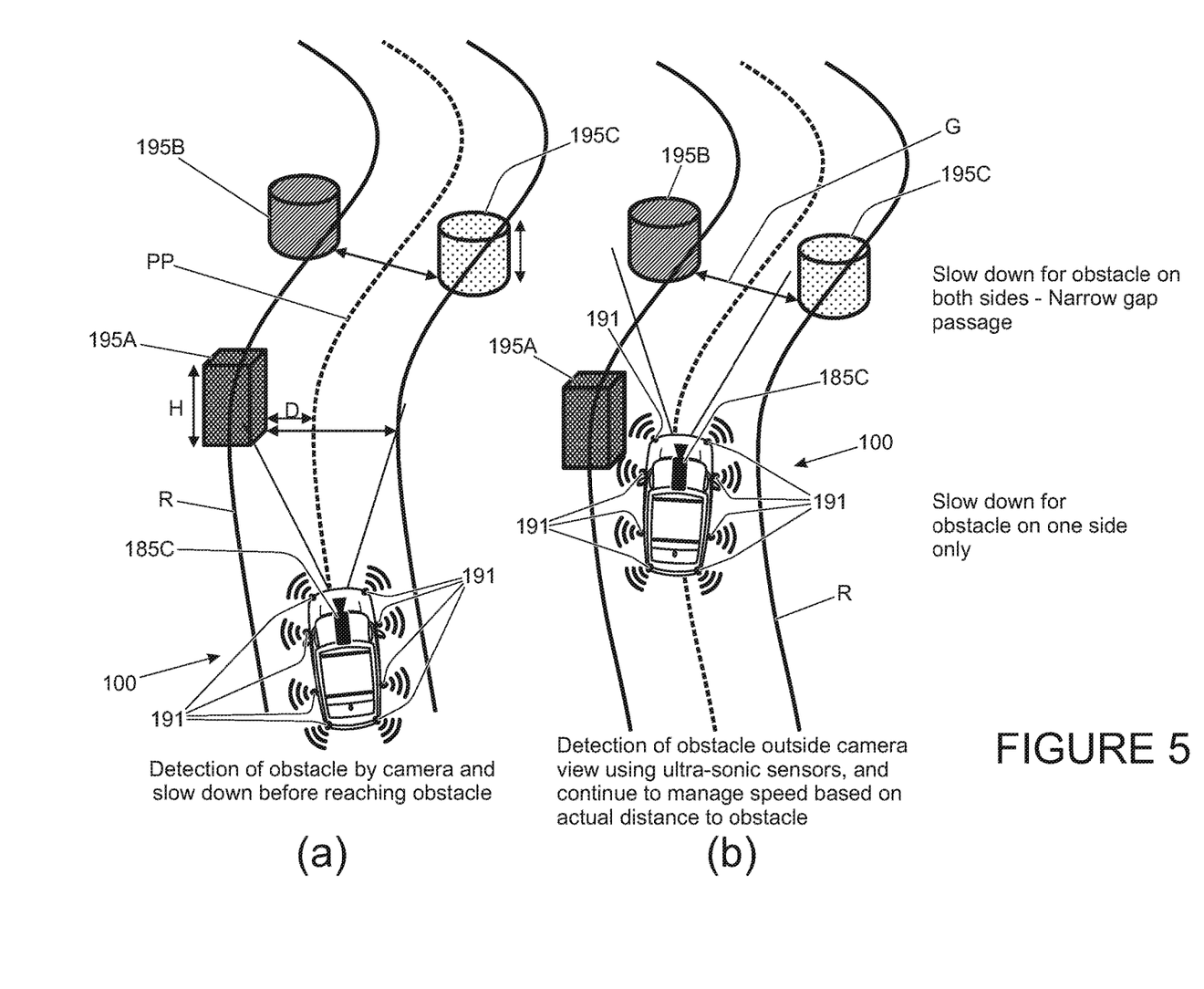
FIG. 5 illustrates a vehicle according to the embodiment of FIG. 1 as the vehicle is (a) approaching an object and (b) passing the object and approaching a gap between two further objects.

As noted above the vehicle 100 also includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses the brake or, in the case of vehicles with a manual transmission, a clutch pedal, control of vehicle speed by the cruise control system 16 is cancelled and the vehicle 100 reverts to a manual mode of operation which requires accelerator or brake pedal input by a user in order to maintain vehicle speed. In addition, detection of a wheel slip event, as may be initiated by a loss of traction, also has the effect of cancelling control of vehicle speed by the cruise control system 16. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user to maintain vehicle speed. Low-speed speed control (or progress control) functionality is not provided by the on-highway cruise control system 16 which operates only at speeds above 25 kph.

In the present embodiment, the LSP control system 12 is activated by pressing LSP control system selector button 178 mounted on steering wheel 171. The system 12 is operable to apply selective powertrain, traction control and braking actions to one or more wheels of the vehicle 100, collectively or individually.

The LSP control system 12 is configured to allow a user to input a desired value of vehicle target speed in the form of a set-speed parameter, user_set-speed, via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system 12 (which is the range from 2 to 30 kph in the present embodiment although other ranges are also useful) and no other constraint on vehicle speed exists whilst under the control of the LSP control system 12, the LSP control system 12 controls vehicle speed in accordance with a LSP control system set-speed value LSP_set-speed which is set substantially equal to user_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

Thus it is to be understood that the LSP control system 12 provides torque control means for automatically causing application of positive and negative torque, as required, to wheels 111, 112, 114, 115 of the vehicle 100 to cause the vehicle 100 to travel in accordance with set-speed value LSP_set-speed, which may also be referred to as a target speed value.

The LSP control HMI 20 is provided in the vehicle cabin so as to be readily accessible to the user. The user of the vehicle 100 is able to input to the LSP control system 12, via the LSP HMI 20, the desired value of user_set-speed as noted above by means of the 'set-speed' button 173 and the '+'/'−' buttons 174, 175 in a similar manner to the cruise control system 16. The LSP HMI 20 also includes a visual display by means of which information and guidance can be provided to the user about the status of the LSP control system 12.

The LSP control system 12 receives an input from the ABS controller 13 of the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161, and an input from the transmission or gearbox 124. This latter input may include signals representative of, for example, the speed of an output shaft of the gearbox 124, an amount of torque converter slip and a gear ratio request. Other inputs to the LSP control system 12 include an input from the cruise control HMI 18 which is representative of the status (ON/OFF) of the cruise control system 16, an input from the LSP control HMI 20, and an input from a gradient sensor 45 indicative of the gradient of the driving surface over which the vehicle 100 is driving. In the present embodiment the gradient sensor 45 is a gyroscopic sensor. In some alternative embodiments the LSP control system 12 receives a signal indicative of driving surface gradient from another controller such as the ABS controller 13. The ABS controller 13 may determine gradient based on a plurality of inputs, optionally based at least in part on signals indicative of vehicle longitudinal and lateral acceleration and a signal indicative of vehicle reference speed (v_actual) being a signal indicative of actual vehicle speed over ground. Methods for the calculation of vehicle reference speed based for example on vehicle wheel speeds are well known. For example in some known vehicles the vehicle reference speed may be determined to be the speed of the second slowest turning wheel, or the average speed of all the wheels. Other ways of calculating vehicle reference speed may be useful in some embodiments, including by means of a camera device or radar sensor.

The HDC system 12HD is activated by depressing button 177 comprised by HDC system HMI 20HD and mounted on the steering wheel 171. When the HDC system 12HD is active, the system 12HD controls the braking system 22 in order to limit vehicle speed to a value corresponding to that of a HDC set-speed parameter HDC_set-speed which may be controlled by a user in a similar manner to the set-speed of the cruise control system 16 and LSP control system, using the same control buttons 173, 173R, 174, 175. The HDC system 12HD is operable to allow the value of HDC_set-speed to be set to any value in the range from 2-30 kph. The HDC set-speed parameter may also be referred to as an HDC target speed. Provided the user does not override the HDC system 12HD by depressing the accelerator pedal 161 when the HDC system 12HD is active, the HDC system 12HD controls the braking system 22 (FIG. 3) to prevent vehicle speed from exceeding HDC_set-speed. In the present embodiment the HDC system 12HD is not operable to apply positive drive torque. Rather, the HDC system 12HD is only operable to cause negative brake torque to be applied, via the braking system 22.

It is to be understood that the VCU 10 is configured to implement a known Terrain Response (TR)® System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response (TR) modes, or control modes.

In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain, being terrain characterised at least in part by relatively high drag, relatively high deformability or compliance and relatively low surface coefficient of friction; a 'grass, gravel or snow' (GGS) driving mode suitable for driving over grass, gravel or snow, being relatively slippery surfaces (i.e. having a relatively low coefficient of friction between surface and wheel and, typically, lower drag than sand); a 'rock crawl' (RC) driving mode suitable for driving slowly over a rocky surface; and a 'mud and ruts' (MR) driving mode suitable for driving in muddy, rutted terrain. Other driving modes may be provided in addition or instead. In the present embodiment the selector 141S also allows a user to select an 'automatic driving mode selection condition' of operation in which the VCU 10 selects automatically the most appropriate driving mode as described in more detail below. The on-highway driving mode may be referred to as a 'special programs off' (SPO) mode in some embodiments since it corresponds to a standard or default driving mode, and is not required to take account of special factors such as relatively low surface coefficient of friction, or surfaces of high roughness.

In order to prevent or at least reduce passenger discomfort due to rapid changes in acceleration rate (jerk) when the LSP control system 12 is controlling vehicle speed, the LSP control system 12 limits the rate of change of acceleration of the vehicle 100 such that it does not exceed a prescribed maximum value. The maximum allowable rate of change of acceleration or maximum allowable jerk value is provided by parameter LSP_J_MAX. The LSP control system 12 also limits the maximum value of rate of acceleration to a value LSP_A_MAX.

The values of LSP_A_MAX and LSP_J_MAX are set in dependence at least in part on TR mode and vehicle speed. In some embodiments, including the present embodiment, the values for TR_mode=sand are higher than the corresponding values for TR_mode=SPO, GGS or MR due to the higher drag imposed on a vehicle 100 traversing sand compared with a vehicle traversing a dry asphalt highway surface, a grass, gravel or snow surface, or a muddy or rutted surface.

The LSP control system 12 causes the vehicle 100 to operate in accordance with the value of LSP_set-speed.

In order to cause application of the necessary positive or negative torque to the wheels, the VCU 10 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In some embodiments torque is applied to the vehicle wheels individually, for example by powertrain torque vectoring, so as to maintain the vehicle at the required speed. Alternatively, in some embodiments torque may be applied to the wheels collectively to maintain the required speed, for example in vehicles having drivelines where torque vectoring is not possible. In some embodiments, the powertrain controller 11 may be operable to implement torque vectoring to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements may also be useful.

Where a powertrain 129 includes one or more electric machines, for example one or more propulsion motors and/or generators, the powertrain controller 11 may be operable to modulate torque applied to one or more wheels in order to implement torque vectoring by means of one or more electric machines.

In some embodiments the LSP control system 12 may receive a signal wheel_slip (also labelled 48 in FIG. 3) indicative of a wheel slip event having occurred. This signal 48 is also supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation on receipt of wheel_slip signal 48. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels (by the powertrain 129 and braking system 22) so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 16 resumed by pressing the resume button 173R or set-speed button 173.

The vehicle 100 is also provided with additional sensors (not shown) which are representative of a variety of different parameters associated with vehicle motion and status. These may be inertial systems unique to the LSP or HDC control systems 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle 100 is travelling.

The sensors (not shown) on the vehicle 100 include, but are not limited to, sensors which provide continuous sensor outputs to the VCU 10, including wheel speed sensors, as mentioned previously, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit) 170C. The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C. The ePAS unit 170C also provides a signal indicative of steering wheel rotational position or angle.

in the present embodiment, the VCU 10 evaluates the various sensor inputs to determine the probability that each of the plurality of different TR modes (control modes or driving modes) for the vehicle subsystems is appropriate, with each control mode corresponding to a particular terrain type over which the vehicle is travelling (for example, mud and ruts, sand, grass/gravel/snow) as described above.

If the user has selected operation of the vehicle in the automatic driving mode selection condition, the VCU 10 then selects the most appropriate one of the control modes and is configured automatically to control the subsystems according to the selected mode. This aspect of the invention is described in further detail in our co-pending patent applications GB2492748, GB2492655 and GB2499279, the contents of each of which is incorporated herein by reference as noted above.

As indicated above, the nature of the terrain over which the vehicle is travelling (as determined by reference to the selected control mode) may also be utilised in the LSP control system 12 to determine an appropriate increase or decrease in vehicle speed. For example, if the user selects a value of user_set-speed that is not suitable for the nature of the terrain over which the vehicle is travelling, the system 12 is operable to automatically adjust the value of LSP_set-speed to a value lower than user_set-speed. In some cases, for example, the user selected speed may not be achievable or appropriate over certain terrain types, particularly in the case of uneven or rough surfaces. If the system 12 selects a set-speed (a value of LSP_set-speed) that differs from the user-selected set-speed user_set-speed, a visual indication of the speed constraint is provided to the user via the LSP HMI 20 to indicate that an alternative speed has been adopted.

Other arrangements may be useful.

In the present embodiment, the vehicle 100 is provided with a stereoscopic camera system 185C configured to generate stereo colour image pairs by means of a pair of colour video cameras. A stream of dual video image data is fed from the cameras to the VCU 10 which processes the image data received to generate a 3D point cloud data set. The path of the vehicle relative to the 3D point cloud path is also predicted. This may be achieved using any known path prediction technology based on an analysis of the 3D point cloud data set, or of the images of the video camera, to determine the most likely vehicle path. The predicted path may be determined by means of an algorithm that analyses features of the image data or the point cloud, in order to recognise the existence of a road of track that the vehicle 100 appears to be following. Alternatively in a simple version, the path prediction may be based solely on a measured steering angle and the current location of the vehicle relative to the 3D point cloud. Optionally a combination of the steering angle and path prediction based on the point cloud may be used. The predicted path is defined in terms of the centreline of a path the vehicle 100 is expected to follow, and includes the area swept by the vehicle 100 as it traverses the predicted path. Thus the width of the predicted path is substantially equal to the width W of the vehicle 100. In the embodiment of FIG. 1 the vehicle 100 has a wheelbase of length L. The steering angle may be in response to a driver input, or, where the car is proceeding in an autonomous manner, to steering requests by a vehicle controller.

Once the predicted path has been identified, the VCU 10 determines whether any relevant objects are present ahead of the vehicle 100 but outside of the predicted path of the vehicle 100. The VCU 10 implements detection means provided by an algorithm to detect any relevant objects ahead of the vehicle 100 based on the 3D point cloud data set. The size of any such relevant objects and their distance from the predicted path is estimated by the VCU 10 and a determination made whether the existence of any relevant objects warrants a reduction in vehicle speed. The VCU 10 therefore provides determining means for determining whether one or more objects detected by means of the detection means lie outside the predicted path.

In the present embodiment, the VCU 10 is configured to consider objects to be relevant only if they are greater than a predetermined height and within a predetermined distance of the vehicle 100. In the present embodiment the predetermined height is around 0.5 m although other values of predetermined height may be employed in some embodiments. The predetermined distance is 5 m in the present embodiment although other distances may be useful.

In the present embodiment, if the VCU 10 has determined that a relevant object does exist ahead of the vehicle, the VCU 10 is configured to determine a maximum allowable value of LSP_set-speed, LSP_set-speed_max, that is to be imposed on the LSP control system 12 and HDC control system 12HD.

In the present embodiment, the value of LSP_set-speed_max is dependent at least in part on the distance of any relevant objects from the predicted path and the estimated height of any such relevant objects. The greater the height of the relevant object, the lower the value of LSP_set-speed_max, i.e. the greater the amount by which LSP_set-speed_max will be less than the value of LSP_set-speed employed prior to reducing the value. Similarly, the value of LSP_set-speed_max reduces with decreasing distance of a relevant object from the predicted path.

By way of example, the value of LSP_set-speed may be reduced by a lower amount if the predicted path passes through an opening in a relatively low wall (where driver visibility of objects beyond the wall is relatively unimpaired), and by a greater amount if the predicted path passes through an opening of similar size in a relatively high wall (that more severely impairs a driver's visibility of objects beyond the wall). Similarly, the value of LSP_set-speed may be reduced by a greater amount as the vehicle 100 approaches a relatively tall tree that is relatively close to the predicted path compared with the amount in the case of a relatively low bush a similar distance from the predicted path.

In the present embodiment the VCU 10 calculates a value of LSP_set-speed_max to be imposed on the LSP control system 12 based on object height H, object distance D from the predicted path and the current value of LSP_set-speed. The value of LSP_set-speed_max is determined by multiplying the current value of LSP_set-speed by an object proximity reduction factor that is less than unity, so that the value of LSP_set-speed_max is always lower than the value of LSP_set-speed, the value of the object proximity reduction factor depending on the value of object height H and distance D from the predicted path.

In some alternative embodiments, the value of LSP_set-speed_max is derived from the distance of a relevant object from the predicted path and the height of the object using a look-up table. If the current value of LSP_set-speed is less than or equal to the value of LSP_set-speed_max obtained from the look-up table then no reduction in LSP_set-speed is made.

In some embodiments the object proximity reduction factor is further dependent on the TR mode in which the vehicle 100 is currently operating. In some embodiments the amount of the speed reduction is less if the vehicle is operating in the SPO (on-highway) TR mode compared with the GGS, MR and RC modes. This is because when in the SPO mode the vehicle 100 is expected to be operating on relatively smooth surfaces with relative high surface coefficient of friction. In the case of the GGS and MR modes the vehicle 100 is expected to be driving on a relatively slippery surface whilst in the RC mode the vehicle 100 is expected to be driving on a relatively rough surface. It is to be understood that other arrangements may be useful in some embodiments.

If one or more relevant objects are determined to be present, the VCU 10 calculates a value of LSP_set-speed_max for each relevant object. The VCU 10 then controls the value of LSP_set-speed so that the speed of the vehicle 100 does not exceed the value LSP_set-speed_max calculated for each relevant object when the vehicle 100 reaches a location at which a forwardmost portion of the vehicle 100 is abreast the respective relevant object.

It is to be understood that, as noted above, the value of LSP_set-speed employed by the VCU 10 may be less than the value requested by a user, user_set-speed, in dependence for example on one or more factors such as the roughness of the surface over which the vehicle 100 is driving in order to manage occupant comfort. This latter reduction may be implemented by the LSP control system 12 automatically, regardless of the presence of any relevant objects ahead of the vehicle 100. Thus some embodiments of the present invention have the feature that the value of LSP_set-speed is further reduced in the event that a relevant object is detected. The reduction takes place when the vehicle 100 is sufficiently close to that object, even if the value of LSP_set-speed has already been set lower than the value of user_set-speed by the LSP control system 12 for the purpose of occupant comfort.

In the present embodiment the VCU 10 is configured to determine, for each relevant object ahead of the vehicle 100, the distance required in order to cause the vehicle 100 to slow from a speed equal to the prevailing value of LSP_set-speed (which may be less than the value of user_set-speed but not greater than that value), or the actual value of vehicle speed if that is different from the prevailing value of LSP_set-speed, to a speed substantially equal to LSP_set-speed_max by the time the vehicle 100 is within a predetermined range of a location on the predicted path at which a forwardmost portion of the vehicle 100 will be abreast the relevant object. In the present embodiment the predetermined range is calculated in dependence at least in part on the value of LSP_set-speed and LSP_set-speed_max, the predetermined range being higher the greater the difference between LSP_set-speed and LSP_set-speed_max.

The VCU 10 determines the distance required to slow the vehicle 100 from the current value LSP_set-speed to the new value LSP_set-speed_max, by reference to the stored values of maximum allowable rate of acceleration/deceleration of the vehicle 100 under the control of the LSP control system 12, LSP_A_MAX, and the corresponding value of maximum allowable rate of change of acceleration (or jerk), LSP_J_MAX, for the prevailing TR mode. The LSP control system 12 then commences deceleration of the vehicle 100 a sufficient distance from the relevant object to allow the speed to reduce to the value LSP_set-speed_max by the time the vehicle 100 is within the predetermined range of the relevant object.

In the present embodiment the VCU 10 calculates the predetermined distance, s, at which speed reduction should be commenced according to the equation:

$$s=((v^2-u^2)/2a)+d,$$

where v=current vehicle speed, u=minimum allowable value of LSP_set-speed, a=LSP_A_MAX, and d=buffer distance from the relevant object at which it is intended that the vehicle 100 will have slowed to the reduced speed LSP_set-speed_max.

Deceleration is commenced by setting the value of LSP_set-speed to the value LSP_set-speed_max. The LSP control system 12 then automatically causes vehicle speed to reduce to a value substantially equal to LSP_set-speed=LSP_set-speed_max in the manner described above.

It is to be understood that the values of LSP_A_MAX and LSP_J_MAX may be dependent at least in part on the prevailing measured or estimated value of surface coefficient of friction as well as the TR mode in which the vehicle 100 is operating. This feature has the advantage that a likelihood of the vehicle 100 experiencing wheel slip may be reduced.

It is to be understood that, when a relevant object is detected, the actual value of vehicle speed may be different from the prevailing value of LSP_set-speed. For example, a user may have recently increased or decreased the value of user_set-speed, resulting in a change in the value of LSP- _set-speed, and the LSP control system 12 may be in the process of adjusting actual vehicle speed to match the new value of LSP_set-speed. The VCU 10 is configured to take into account any such differences between actual speed and LSP_set-speed and ensure that the vehicle 100 is able to slow to an actual speed not exceeding LSP_set-speed_max by the time the vehicle 100 reaches the predetermined distance from the nearest relevant object. In the present embodiment the value of LSP_set-speed_max is calculated based on the value of LSP_set-speed that the LSP control system 12 is attempting to cause the vehicle 100 to operate at when one or more relevant objects are identified.

It is to be understood that the LSP control system 12 may continue to calculate a value of LSP_set-speed to be employed in the absence of any relevant objects, for example based on passenger comfort considerations, and calculate an updated value of LSP_set-speed_max to be employed by the LSP control system 12 in light of any changes to the value of LSP_set-speed to be employed in the absence of any relevant objects. In some embodiments the LSP control system 12 may be configured not to allow a revised value of LSP_set-speed_max to be employed that is higher than the value currently in use once the vehicle 100 is within the predetermined range of a relevant object.

It is to be understood that after reducing vehicle speed to LSP_set-speed_max, the VCU 10 continues to prevent the value of LSP_set-speed exceeding LSP_set-speed_max until the vehicle 100 has passed the relevant object. However, the VCU 10 attempts to repeatedly refine the value of LSP_set-speed_max as the vehicle 100 approaches the relevant object, based on 3D point cloud data captured by the camera system 185C and, where available, data obtained by means of proximity sensors 191 fitted to the vehicle 100 at respective locations around a periphery of the vehicle 100 and described in more detail below. The proximity sensors 191 thus allow the LSP set speed to be refined, and the method in general to be performed, even when the object has passed out of view of the camera system 185C. As further described below, the proximity sensors allow the LSP control system 12 to continue to track the object and identify when the vehicle has passed the object sufficiently to end the temporary reduction in LSP_set-speed_max and return to the previous value of LSP_set-speed.

FIG. 5(a) shows a vehicle 100 travelling on a road or track R. At the location of the vehicle 100 shown, the VCU 10 has determined that the predicted path of the vehicle is as shown by dotted line PP. The VCU 10 has determined that three relevant objects are present ahead of the vehicle, shown at 195A, 195B and 195C. The VCU 10 has also calculated the height H of each relevant object and the distance D of each object from a centreline of the predicted path PP. It is to be understood that, as noted above, the predicted path PP is defined, in the present embodiment, as the area swept by the vehicle 100 as it travels and is defined with respect to the centreline of the path to be followed by the vehicle 100. The distance of an object from the predicted path PP may be considered to be equal to the distance D of the object from the centreline of the predicted path minus half the value of the width W of the vehicle, i.e. (D−W/2).

As the vehicle 100 approaches the first relevant object 195A, the VCU 10 causes vehicle speed to fall to a value LSP_set-speed_max prior to the vehicle 100 reaching the relevant object 195A. As the vehicle 100 approaches and passes the relevant object 195A, as illustrated in FIG. 5(b), in the present embodiment the VCU 10 employs a set of proximity sensors 191 fitted to the vehicle 100 at respective locations around a periphery of the vehicle 100 to detect the object 195A. The VCU 10 is thereby able to detect when the vehicle 100 has passed the relevant object 195A even though the object may no longer be visible by the stereoscopic camera system 185C. Once the vehicle 100 has passed the object 195A the VCU 10 causes the vehicle 100 to resume operation at a value of LSP_set-speed substantially equal to user_set-speed unless a lower value is deemed appropriate by the LSP control system 12 due to comfort considerations as described above.

In the case of the scenario illustrated in FIG. 5, at the location of the vehicle 100 shown in FIG. 5(b) the two forwardmost proximity sensors 191 on the left side of the vehicle 100 have detected the presence of the first relevant object 195A. The VCU 10 tracks the passage of the object 195A past the vehicle 100 by means of the sensors 191 on the side of the vehicle 100 on which the object 195A is present. Once the VCU 10 has determined that the vehicle 100 has passed the object 195A he LSP control system 12 is then permitted to set the value of LSP_set-speed to a value higher than LSP_set-speed_max as appropriate.

In the scenario illustrated in FIG. 5(b) it can be seen that two of the relevant objects 195B, 195C detected by the VCU 10 define a gap G through which the vehicle 100 must pass. In the present embodiment, the VCU 10 is configured such that when two or more relevant objects are detected ahead of the vehicle 100 at substantially the same distance from the vehicle 100 with respect to the centreline of the predicted path PP and in which at least one object is present on each side of the predicted path PP, the VCU 10 determines the size of the gap G between the objects. In the present embodiment the VCU 10 calculates the average distance of the objects 195B, 195C from the predicted path, (G−W)/2 where W is the width of the vehicle 100. The VCU 10 then calculates the value of LSP_set-speed_max that would be employed if the vehicle 100 were to pass a single object that was half this average distance from the vehicle 100, i.e. a distance (G−W)/4 from the vehicle 100. The value of LSP_set_speed is then controlled such that the vehicle speed does not exceed this value of LSP_set-speed_max as the vehicle 100 approaches and passes through the gap.

In some alternative embodiments, the VCU 10 employs a separate look-up table to determine the value of LSP_set-speed_max when the predicted path passes through a gap between relevant objects.

As the vehicle 100 approaches a relevant object 195, the VCU 10 monitors the proximity of the vehicle 100 to the object 195 and may further reduce the value of LSP_set-speed_max as the vehicle 100 approaches the object 195 in dependence on the proximity of the object to the predicted path PP. It is to be understood that the predicted path PP is refined repeatedly as the vehicle 100 progresses, enabling a more accurate determination of the distance of a relevant object 195 from the predicted path PP as the vehicle 100 approaches the object 195.

It is to be understood that where a plurality of objects 195 (or obstacles 195) are determined to be present, the VCU 10 may calculate a value of LSP_set-speed_max for each object 195 (or obstacle 195) ahead of the vehicle 100 individually. In addition, where a gap G exists between two or more objects 195 that will be passed at substantially the same position along the predicted path PP, the VCU 10 may calculate a further value of LSP_set-speed_max taking into account the size of the gap G as described above. The VCU 10 may compare the value of LSP_set-speed_max calculated taking the gap G into account with values of LSP_set-speed_max calculated based on the objects 195 being isolated, set the value of LSP_set-speed_max to the lower of the values of LSP_set-speed_max calculated in this manner. This feature has the advantage that if the vehicle 100 passes through the gap more closely to one object 195 than the other, resulting in a value of LSP_set-speed_max that is lower than that calculated based on gap G, the value of LSP_set-speed_max may be set to that lower value.

It is to be understood that the value of LSP_set-speed_max can be dependent on one or more other factors, such as a parameter, factor or setting indicative of a level of driving comfort the driver desires. For example the vehicle may have a driver-operable control such as a dial or touchscreen interface function allowing a driver to indicate the desired level of comfort to be experienced by vehicle occupants. The VCU 10 may adjust the value of LSP_set-speed_max in dependence at least in part on the desired level of comfort indicated by the driver-operable control. For example, one or more look-up tables may be provided allowing the VCU 10 to determine the required value of LSP_set-speed_max in dependence on the desired level of comfort indicated by the driver-operable control.

Figure 6:
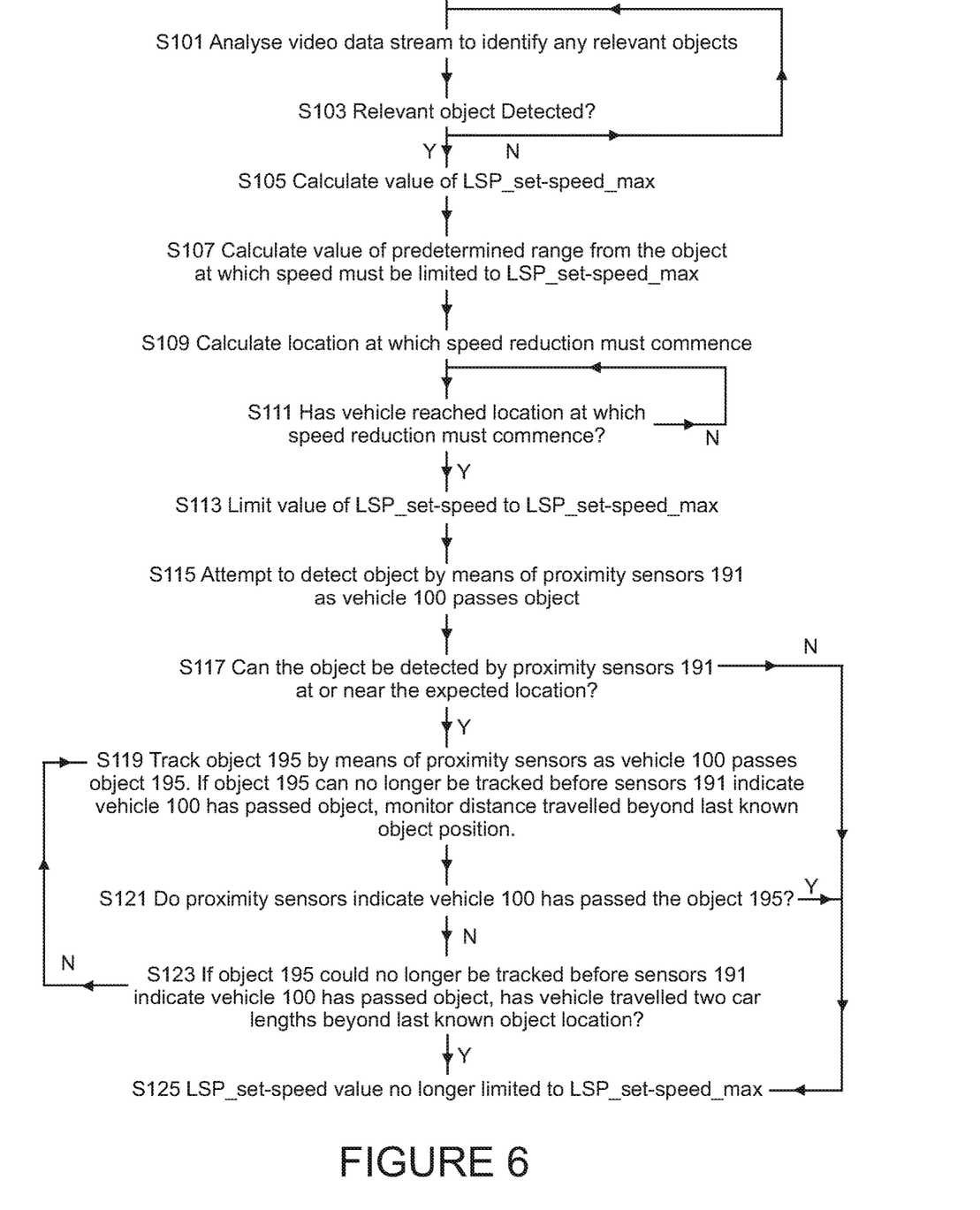
FIG. 6 is a flow chart illustrating operation of a vehicle according to the embodiment of FIG. 1

FIG. 6 is a flow diagram illustrating the method of vehicle control implemented by the present embodiment.

At step S101 the VCU 10 analyses the stream of video data received from the camera system 185C to identify the presence of any relevant objects 195.

At step S103 the VCU 10 determines whether any relevant objects 195 are present in the image data. If any such objects 195 are present the VCU 10 moves to step S105 else the VCU 10 continues at step S101.

At step S105 the VCU 10 calculates a value of LSP_set-speed_max in respect of each relevant object 195.

At step S107 the VCU 10 calculates the value of predetermined range from each object 195 identified at step S101 at which speed must be limited to the value of LSP_set-speed_max corresponding to each object 195.

At step S109 the VCU 10 determines the location along the predicted path PP at which speed reduction must commence.

At step S111 the VCU 10 determines whether the vehicle 100 has reached or passed the location at which the speed reduction must commence. If the vehicle 100 has not reached this location the VCU 10 repeats step S111 else the VCU 10 continues at step S113.

At step S113 the VCU 10 sets the value of LSP_set-speed substantially equal to LSP_set-speed_max, since the vehicle 100 has now arrived at or passed the location at which the speed reduction must commence. It is to be understood that in certain situations the VCU 10 may determine that a relevant object 195 is present ahead of the vehicle 100 when there is insufficient time to reduce the vehicle speed to the value LSP_set-speed_max before reaching the object 195. The VCU 10 nevertheless sets the value of LSP_set-speed to LSP_set-speed_max and employs the maximum allowable rate of deceleration to reduce vehicle speed.

At step S115 the VCU 10 attempts to detect the relevant object 195 by means of proximity sensors 191 as the vehicle 100 passes the object 195.

At step S117 the VCU 10 determines whether the relevant object 195 was detected at the expected location. If it was not, the VCU 10 continues to step 125, on the basis that the object 195 was most likely falsely detected and does not exist. If the object 195 was detected, the VCU 10 continues to step S119.

At step S119 the VCU 10 attempts to track the position of the relevant object 195 relative to the vehicle 100 by means of proximity sensors 191 as the vehicle 100 passes the object 195. If the VCU 10 determines that the object 195 can no longer be tracked by the sensors 191 before the sensors 191 indicate that the vehicle 100 has passed the object, the VCU 10 monitors the distance travelled by the vehicle 100 beyond the last known position of the object 195.

At step S121 the VCU 10 determines whether the proximity sensors 19 indicate that the vehicle 100 has passed the object 195. If the sensors 191 do indicate that the vehicle 100 has passed the object 195, the VCU 10 continues at step S125 else the VCU 10 continues at step S123.

At step S123 the VCU 10 determines whether the vehicle has yet travelled two car lengths beyond the last known object location. If the vehicle 100 has not travelled this distance, the VCU 10 continues at step S119 else the VCU 10 continues at step S125.

At step S125 the value of LSP_set-speed is no longer limited to LSP_set-speed_max.

Some embodiments of the present invention enable vehicle operation with enhanced composure when approaching objects that are close to a predicted path, by reducing driver workload. This is because a driver is not required manually to decrease the value of user_set-speed in order to reduce vehicle speed when approaching objects that are close to the predicted path, or cancel control of vehicle speed by the LSP control system 12 if they feel vehicle speed is too high as they approach such objects. Rather, the vehicle 100 proactively detects the presence of objects close to the predicted path and reduces speed accordingly.

It is to be understood that some embodiments of the present invention have the advantage that sudden overbraking by a driver on high drag terrain such as sand, in response to the presence of one or more objects close to the predicted path of the vehicle 100, may be prevented. This is because the vehicle 100 causes a reduction in speed automatically, if required, so that the one or more objects are passed at a speed the driver is more likely to be comfortable with. Some embodiments of the present invention give rise to greatly enhanced vehicle composure when driving across varied terrain with objects such as trees, bushes or rocks located close to the predicted path.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics, described in conjunction with a particular aspect, embodiment or example of the invention are to be understood to be applicable to any other aspect, embodiment or example described herein unless incompatible therewith.

The invention claimed is:

1. A control system for a vehicle, comprising:
    torque control means for automatically causing application of positive and negative torque, as required, to one or more wheels of the vehicle to cause the vehicle to travel in accordance with a target speed value;

path prediction means for predicting a path of the vehicle in a direction of travel;

detection means for detecting one or more stationary objects ahead of the vehicle;

determining means to determine whether the one or more stationary objects detected by the detection means lie outside the predicted path; and control means configured to, if said one or more detected stationary objects are determined to lie outside the predicted path, automatically reduce a speed of the vehicle in dependence on a distance of the one or more detected stationary objects from the predicted path and independent of any moving objects;

wherein reducing the vehicle speed comprises the control means limiting the vehicle speed to a speed limit value, and wherein said speed limit value is determined at least in part in dependence on the distance of the one or more detected stationary objects from the predicted path and/or a height of the one or more detected stationary objects.

2. The control system according to claim 1 wherein reducing the vehicle speed comprises the control means reducing the vehicle speed responsive to the one or more detected stationary objects being within a predetermined distance of the predicted path.

3. The control system according to claim 1 wherein the speed limit value is arranged to reduce with reducing distance of the one or more detected stationary objects from the predicted path.

4. The control system according to claim 3 operable to determine the distance at which the reduction in vehicle speed should commence.

5. The control system according to claim 3 wherein the speed limit value is a predetermined speed limit value.

6. The control system according to claim 1 wherein reducing the vehicle speed comprises the control means reducing the vehicle speed at least in part in dependence on an identity of a selected one of a plurality of driving modes in which the vehicle is operating.

7. The control system according to claim 6 wherein in each driving mode at least one of a plurality of vehicle subsystems is caused to operate in a predetermined one of a plurality of configuration modes of that subsystem, the predetermined one of the plurality of configuration modes of that subsystem being determined in dependence on the selected driving mode.

8. The control system according to claim 7 wherein the subsystems include at least one selected from the group consisting of: a powertrain subsystem, a brakes subsystem and a suspension subsystem.

9. The control system according to claim 1 wherein the torque control means comprises an electric controller configured to communicate with a powertrain controller and a brakes controller.

10. The control system according to claim 1 further configured to automatically reduce the vehicle speed in further dependence at least in part on a comfort indicator generated in response to a control input provided by a user.

11. The control system according to claim 1 wherein the detection means comprises a stereoscopic camera or a lidar system.

12. The control system according to claim 1 further comprising a proximity sensor.

13. The control system according to claim 12 wherein the control means is configured to alter the speed of the vehicle after the speed reduction.

14. The control system according to claim 12 wherein the control means is configured to determine when the vehicle has passed the one or more detected stationary objects and to increase the vehicle speed.

15. The control system according to claim 1 wherein the path prediction means for predicting the path of the vehicle in the direction of travel is configured to receive one or more of: image data, point cloud data, and steering angle data.

16. The vehicle comprising the control system according to claim 1.

17. The control system according to claim 1, wherein the greater the height of the one or more detected stationary objects, the lower the speed limit value.

18. A method of controlling the speed of a vehicle implemented by means of a control system, comprising:

automatically causing application of positive and negative torque to one or more wheels of the vehicle to cause the vehicle to travel in accordance with a target speed value; and predicting a path of the vehicle in a direction of travel; and detecting whether one or more detectable stationary objects are present ahead of the vehicle, whereby the method further comprises determining whether the one or more detectable stationary objects ahead of the vehicle lie outside the predicted path, in the event that the one or more detectable stationary objects are determined to be present ahead of the vehicle and to lie outside the predicted path the method comprising automatically reducing the vehicle speed in dependence on a distance of the one or more detectable stationary objects from the predicted path and independent of any moving objects;

wherein reducing the vehicle speed comprises limiting the vehicle speed to a speed limit value, and wherein said speed limit value is determined at least in part in dependence on the distance of the one or more detected stationary objects from the predicted path and/or a height of the one or more detected stationary objects.

19. A tangible, non-transitory computer-readable medium storing instructions that, when executed by a processor, cause the processor to perform the method of claim 18.

* * * * *